United States Patent Office 3,702,862
Patented Nov. 14, 1972

3,702,862
ALKYL- AND HALO-SUBSTITUTED PHENOXY BENZONITRILES
Akihiko Mine, Minoo-shi, Katsuzo Kamoshita and Naganori Hino, Toyonaka-shi, and Shinji Nakai, Takarazuka-shi, Japan, assignors to Sumitomo Chemical Company, Ltd., Osaka, Japan
No Drawing. Filed Mar. 10, 1969, Ser. No. 805,882
Claims priority, application Japan, Mar. 13, 1968, 43/16,847
Int. Cl. A01n 9/20; C07c 121/74
U.S. Cl. 260—465 F    10 Claims

ABSTRACT OF THE DISCLOSURE

New diphenyl ethers having the general formula,

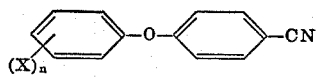

wherein X is a member or the same or different members selected from the group consisting of alkyl groups having 1 to 4 carbon atoms and halogen atoms, and $n$ is an integer of 1–3, which are prepared by reducing substituted phenyl-4'-nitrophenyl ether having the general formula,

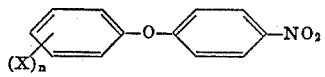

wherein X and $n$ have the same significances as mentioned above, diazotizing and then subjecting to Sandmeyer or Gattermann reaction, or by reacting an alkali metal salt of a substituted phenol, or a mixture of a substituted phenol and a hydroxide or carbonate of an alkali metal with p-halogen-substituted benzonitrile at a temperature of 100° to 200° C. in a solvent of dimethylformamide or dimethylsulfoxide.

A new herbicidal composition comprising a herbicidal amount of at least one compound represented by the formula,

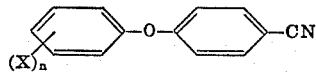

wherein X and $n$ have the same significances as mentioned above.

This invention relates to a novel diphenyl ether, to a process for preparing the same, and herbicidal compositions containing the same.

More particularly, the invention pertains to
(1) A novel diphenyl ether type compound represented by the formula

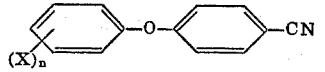 (I)

wherein X signifies a member or the same or different members selected from the group consisting of alkyl groups having 1 to 4 carbon atoms and halogen atoms, and $n$ signifies an integer of 1–3, and
(2) A process for preparing diphenyl ethers represented by said Formula I, characterized in that a substituted phenyl-4'-nitrophenyl ether represented by the formula,

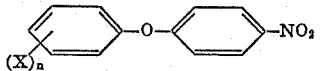 (II)

wherein X and $n$ have the same significances as mentioned above is reduced, diazotized and then subjected to Sandmeyer or Gatterman reaction, or an alkali metal salt of a substituted phenol represented by the formula,

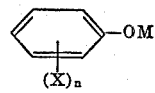 (III)

wherein X and $n$ have the same significances as mentioned above, and M signifies an alkali metal, and a p-halogen-substituted benzonitrile represented by the formula,

 (IV)

where Y signifies a chlorine or bromine atom, are subjected to condensation reaction in the presence of dimethyl sulfoxide or dimethyl formamide as a solvent.

Generally, it has already been well known that nitrodiphenyl ethers, e.g. 2,4-dichlorophenyl-4'-nitrophenyl ether, have herbicidal actions. However, the said compounds are low in selective herbicidal actions on plants and sometimes kill desired crop plants. Particularly when applied to paddy fields, they are undesirably low in selectivity between the rice plants and barnyard grasses.

In an attempt to develop herbicides capable of strongly controlling injurious weeds to agricultural crop plants, without affecting the growth of desirable crop plants, the present inventors continued various studies to find that the compounds obtained according to the present process have various selective herbicidal actions, which were not seen in many nitrodiphenyl ethers of the prior art, and, particularly when applied to paddy field, they can kill main paddy field weeds without giving any injury to the growth of transplanted rice seedlings and directly sowed rice.

That is, the present compounds represented by the aforesaid Formula I have excellent herbicidal effects on a wide scope of weeds, e.g. grass family weeds such as barnyard grass (Echinochloa crus-galli), crab grass (Digitania sanguinalis), dent foxtail (Alopecurus aequalis), etc. and broad-leaved weeds such as chickweeds (Stellaria media), common purslane (Portulaca olearceae), Piligonum spp. false pimpernel (Linderna pyxidaria), Monochoria vaginalis, Rotal indica, etc.

Further, the present compounds are applicable according to any treatment procedure of pre-emergence treatment or post-emergence treatment. Further, the present compounds are quite effectively applied to paddy fields and can kill such main paddy field weeds as barnyard grass, Monochoria vaginalis, Linderna pyxidaria, Rotal indicia, nutsedges (Cyperus spp.), spikerush (Ekocharia acicularis), etc., without any phytotoxicity towards transplated rice seedlings and directly sowed rice.

The present compounds are not only applicable to paddy fields but also usable as herbicides for application to various cereal fields, vegetable fields, orchards, lawns, meadows, non-agricultural fields, etc.

The present invention has been established on the basis of the above-mentioned novel knowledge.

An object of the present invention is to provide a novel diphenyl ether type compound represented by the aforesaid Formula I.

Another object is to provide a process for preparing diphenyl ether type compounds represented by the Formula I.

Other object is to provide a new herbicidal composition containing as an active ingredient the diphenyl ether type compounds represented by the Formula I.

These and other objects of the invention can be accomplished by provision of a novel diphenyl ether having the general formula,

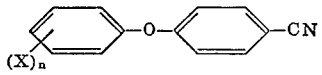

wherein X is the same or different alkyl groups and $n$ is an integer of 1–3, and a process for preparing diphenyl ethers represented by the formula,

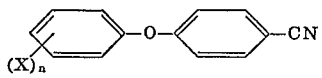

wherein X is the same or different alkyl groups and $n$ is an integer of 1–3, which comprises reducing substituted phenyl-4′-nitrophenyl ether having the general formula,

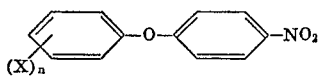

wherein X and $n$ have the same significances as mentioned above, diazotizing and then subjecting to Sandmeyer or Gattermann reaction, or comprises reacting an alkali metal salt of a substituted phenol, or a mixture of a substituted phenol and a hydroxide or carbonate of an alkali metal with p-halogen-substituted benzonitrile at a temperature of 100° to 200° C. in a solvent of dimethylformamide or dimethylsulfoxide.

In carrying out the present invention, the process is divided into the two methods set forth below.

(i) The first method is carried out in such a manner that a substituted phenyl-4′-nitrophenyl ether (II) synthesized by a process disclosed in, for example, J.A.C.S. 52 1208 (1930) is formed into a compound (V) by reducing the nitro group according to an ordinary procedure and the compound (V) is converted to a diazonium salt thereof (VI), which is then subjected to Sandmeyer or Gattermann reaction to obtain the desired compound (I), as shown by the following reaction Equations 1, 2 and 3:

(1)
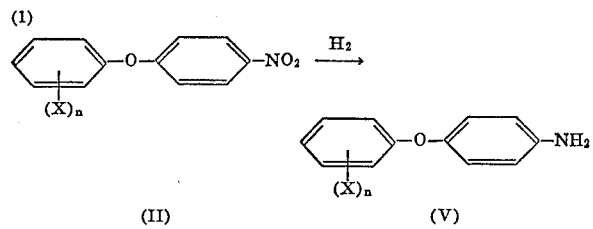

(2)
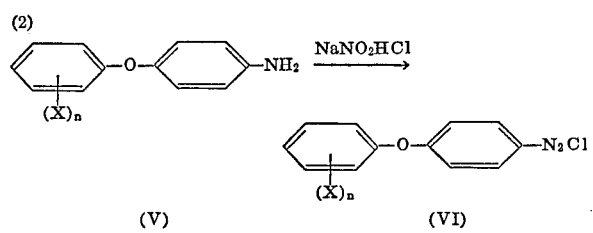

(3)
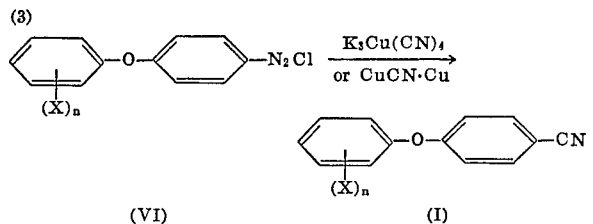

wherein X and $n$ have the same significances as mentioned previously.

The reduction reaction of said step (1) is effected either by adding a reduction catalyst to a solution of the substituted phenyl-4′-nitrophenyl ether (II) in an inert organic solvent and introducing hydrogen therein to carry out catalytic reduction, or by gradually adding the substituted phenyl-4′-nitrophenyl ether (II) to an iron powder-containing dilute hydrochloric acid maintained at a high temperature.

The step (2) is carried out in such a manner that the substituted phenyl-4′-aminophenyl ether (V) obtained in the step (1) is dissolved in dilute hydrochloric acid and an aqueous sodium nitrite solution is added drop by drop at below 5° C.

In the step (3), the desired substituted phenyl-4′-cyanophenyl ether (I) is obtained in the form of oil either by adding drop by drop the diazonium salt (VI) obtained in the step (2) to an aqueous potassium cuprous cyanide solution maintained at a high temperature, or by adding copper powder or copper cyanide to a solution of the diazonium salt (VI).

(ii) The second method is carried out in such a manner that an alkali metal salt of a substituted phenol (III), or a mixture of a substituted phenol and a hydroxide or carbonate of an alkali metal, and a p-halogen-substituted benzonitrile (IV) are added to dimethyl formamide or dimethyl sulfoxide, and the resulting mixture is heated under stirring at 100°–200° C., preferably 140°–150° C., as shown by the following reaction Equation 4:

(4)
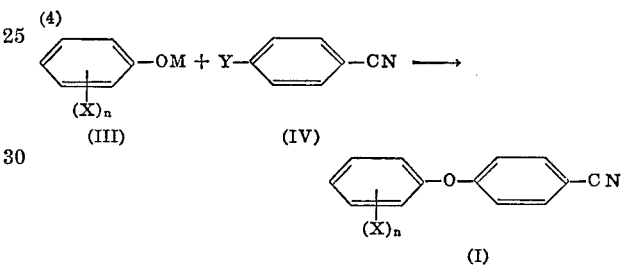

wherein X, Y, M and $n$ have the same significances as mentioned previously.

The thus obtained compounds of the present invention are not only new compounds unknown to the literature but also have particularly marked selective herbicidal actions unlike many conventional nitrodiphenyl ethers. Particularly when applied to paddy fields, they show strong herbicidal actions towards main paddy field weeds, and hence are quite useful as agricultural herbicides.

Examples of the present compounds represented by the Formula I are as set forth below, but compounds of the present invention are, of course, not limited only to these.

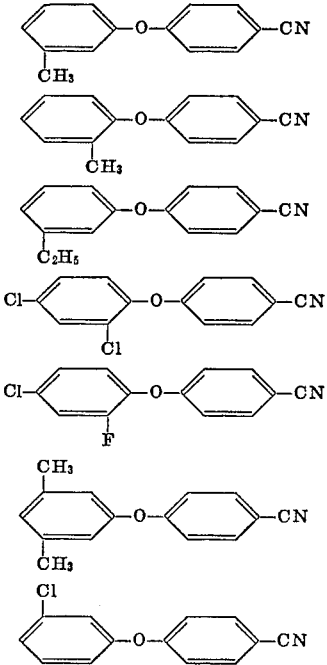

(8) 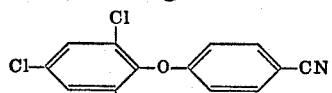

(9) 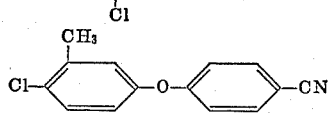

In actual application, the present compounds may be sprayed as they are. Alternatively, they may be used in any forms of dusts, granules, wettable powders and emulsifiable concentrates. In formulating these preparations, there may be used such solid carriers as, for example, talc, bentonite, clay, kaolin, diatomaceous earth, vermiculite, slacked lime, etc., or such liquid carriers as, for example, benzene, alcohols, acetone, xylene, methyl naphthalene, dioxane, cyclohexanone, etc.

In actual use, the present compounds may not only be enhanced and made accurate in effectiveness by using in admixture with surface active agents such as spreaders and adhesives which are used for agricultural purposes but also be used in admixture with fungicides, insecticides, other herbicides and the like agricultural chemicals or with fertilizers.

In order to substantiate the effectiveness of the present invention, typical test results will be shown in the experimental example set forth below in which the names of compounds are represented by the exemplification numbers of the previously mentioned compounds.

EXPERIMENTAL EXAMPLE

Wagner pots of 14 cm. in diameter, which had individually been packed with 1.5 kg. of paddy field soil, were brought into the state of paddy fields. Rice seedlings at the 3 leaves stage were transplanted and further barnyard grass seeds were sowed in the pots. Subsequently, the pots were charged with water and were treated with given amounts of chemicals. On the 25th day after the chemical treatment, the herbicidal effects and phytotoxicities of the chemicals on the transplanted and sowed plants and on spontaneously germinated broad-leaved weeds such as *Monochoria vaginalis, Lindernia pyxidaria, Rotal indica*, etc. were investigated to obtan the results as set forth in Table 1. In the table, the evaluations of the herbicidal effects and phytotoxicities were represented by the figures of 0–5 as shown below.

| 0 | Injury on the plants | None. |
|---|---|---|
| 1 | do | Slight. |
| 2 | do | Less. |
| 3 | do | Moderate. |
| 4 | do | Great. |
| 5 | Plants completely died | |

TABLE 1.—SOIL TREATMENT TEST RESULTS

| Name of compound | Amount applied (g./10 a.) | Phytotoxicity, rice plants | Herbicidal effect Barnyard grasses | Broadleaved weeds |
|---|---|---|---|---|
| Compound: | | | | |
| 1 | 250 | 0 | 5 | 5 |
|   | 125 | 0 | 4 | 5 |
|   | 63 | 0 | 2 | 4 |
| 2 | 250 | 0 | 5 | 5 |
|   | 125 | 0 | 4 | 4 |
|   | 63 | 0 | 2 | 4 |
| 3 | 250 | 0 | 5 | 5 |
|   | 125 | 0 | 4 | 4 |
|   | 63 | 0 | 2 | 4 |
| 4 | 250 | 0 | 5 | 5 |
|   | 125 | 0 | 5 | 5 |
|   | 63 | 0 | 4 | 5 |
| 6 | 250 | 0 | 5 | 5 |
|   | 125 | 0 | 3 | 5 |
|   | 63 | 0 | 2 | 4 |
| 8 | 250 | 0 | 5 | 5 |
|   | 125 | 0 | 3 | 4 |
|   | 63 | 0 | 3 | 5 |
| 9 | 250 | 0 | 3 | 5 |
|   | 125 | 0 | 2 | 4 |
|   | 63 | 0 | 1 | 2 |
| Control, 2,4-dichlorophenyl-4'-nitrophenyl ether | 250 | 2 | 5 | 5 |
|   | 125 | 1 | 5 | 5 |
|   | 63 | 0 | 4 | 5 |
| Control, pentachlorophenol (Na salt) | 500 | 3 | 4 | 5 |
|   | 250 | 2 | 3 | 5 |

The present invention will be illustrated below with reference to examples, but it is needless to say that the invention is not limited to these and the kinds and mixing proportions of the compounds and additives are variable within a wide range. Parts and percent are by weight.

EXAMPLE 1

20 parts of the compound (1), 5 parts of Sorpol 2170 (registered trade name for an emulsifier produced by Toho Kagaku K.K.) and 75 parts of talc were thoroughly pulverized and mixed together to obtain a wettable powder.

EXAMPLE 2

15 parts of the compound (4), 15 parts of Sorpol SM 200 (registered trade name for an emulsifier produced by Toho Kagaku K.K.) and 70 parts of cyclohexanone were thoroughly mixed together to obtain an emulsifiable concentrate.

EXAMPLE 3

7 parts of the compound (8), 35 parts of bentonite, 55 parts of clay and 3 parts of Toyoliguin NP (registered trade name for a product of Toyo Boseki K.K.) were thoroughly pulverized and mixed together. The mixture was thoroughly kneaded with water and was then granulated and dried to obtain a granular preparation.

EXAMPLE 4

To a solution of 22.9 g. of 3-methylphenyl-4'-nitrophenyl ether in 100 cc. of benzene was added a catalytic amount of platinum oxide. Subsequently, hydrogen was introduced into the mixture under vigorous stirring at room temperature. After about 3 hours, a required amount of hydrogen (2,400 l., 20° C., 760 mm. Hg) had been absorbed. Accordingly, the mixture was filtered to remove the catalyst, and then the solvent was removed by distillation to obtain 3-methylphenyl-4'-aminophenyl ether.

To this 3-methylphenyl-4'-aminophenyl ether was added 100 g. of 20% hydrochloric acid to form pasty hydrochloride. This hydrochloride was cooled to below 5° C. and a solution of 7.6 g. of sodium nitrite in 20 cc. of water was added drop by drop thereto under stirring to obtain a diazonium salt. The thus obtained diazonium salt was added drop by drop under stirring to a solution of 31.2 g. of potassium cuprous cyanide in 20 cc. of water which had been maintained at 60°–70° C. After continuing the stirring at said temperature for 1 hour, the reaction mixture was cooled to room temperature and was then subjected to benzene extraction. The benzene layer was repeatedly washed with dilute alkali, dilute acid and water, and was then dried over Glauber's salt, and the benzene was removed by distillation, whereby 16.3 g. of black, oily 3 - methylphenyl-4'-cyanophenyl ether was obtained. This ether was purified according to column chromatography to obtain 15.0 g. of pale yellow 3 - methylphenyl - 4' - cyanophenyl ether, $n_D^{21.5}$ 1.5853, B.P. 117°–118° C./0.2 mm. Hg.

Elementary analysis for $C_{14}H_{11}NO$.—Calculated: (percent): C, 80.36; H, 5.30; N, 6.69. Found (percent): C, 79.93; H, 5.26; N, 6.71.

EXAMPLE 5

28.4 g. of 2,4-dichlorophenyl-4'-nitrophenyl ether was reduced in the same manner as in Example 4 to obtain 2,4 - dichlorophenyl - 4' - aminophenyl ether, which was then formed into a diazonium salt thereof. This diazonium salt was reacted with potassium cuprous cyanide and the reaction product was purified according to column chromatography to obtain 18.7 g. of 2,4 - dichlorophenyl - 4'-cyanophenyl ether, $n_D^{15.0}$ 1.639.

Elementary analysis for $C_{13}H_7Cl_2NO$.—Calculated (percent): C, 59.34; H, 2.68; Cl, 26.95; N, 5.32. Found (percent) C, 59.03; H, 2.60; Cl, 27.06; N, 5.41.

EXAMPLE 6

A mixture comprising 50 g. of iron powder, 50 g. of water and 20 g. of hydrochloric acid was stirred. When the generation of hydrogen had ceased, 3,5-dimethylphenyl-4'-nitrophenyl ether was added little by little. After all the ether had been added, the mixture was heated for 3 hours while being stirred, thereby to complete the reaction. After cooling, the reaction mixture was made alkaline by addition of a 10% aqueous caustic soda solution and was extracted several times with benzene. The benzene layer obtained was shaken together with a large amount of dilute hydrochloric acid, and then the aqueous layer was again made alkaline and was subjected to benzene extraction. The thus obtained benzene layer was washed with water and was dried over Glauber's salt, and then the benzene was removed by distillation, whereby black brown 3,5-dimethylphenyl-4'-aminophenyl ether was obtained. This ether was formed into a diazonium salt in the same manner as in Example 4. Subsequently, the diazonium salt was reacted with cuprous cyanide and the reaction product was purified according to column chromatography to obtain 14.5 g. of 3.5-dimethylphenyl-4'-cyanophenyl ether, $n_D^{21.0}$ 1.603.

Elementary analysis for $C_{15}H_{13}NO$.—Calculated (percent): C, 80.69; H, 5.86; N, 6.27. Found (percent): C, 80.50; H, 5.81; N, 6.09.

EXAMPLE 7

26.3 g. of 3-methyl-4-chlorophenyl-4'-nitrophenyl ether was reduced in the same manner as in Example 4 to obtain 3 - methyl-4-chlorophenyl-4'-aminophenyl ether, which was then formed into a diazonium salt thereof. To this diazonium salt was added under thorough stirring at 0°–5° C. a mixture comprising 19.5 g. of potassium cyanide and 12 g. of copper powder, whereby a reaction progressed with generation of nitrogen gas. After the generation of nitrogen gas had ceased the reaction mixture was subjected to benzene extraction in the same manner as in Example 4 and was dried over Glauber's salt, and the benzene was removed by distillation, whereby 11.2 g. of 3-methyl-4-chlorophenyl-4'-cyanophenyl ether was obtained. This ether was purified according to column chromatography to obtain 16.0 g. of pale yellow 3-methyl-4-chlorophenyl-4'-cyanophenyl ether.

Elementary analysis for $C_{14}H_{10}NOCl$.—Calculated (percent): C, 69.00; H, 4.13; N, 5.74; Cl, 14.55. Found (percent): C, 68.88; H, 4.10; N, 5.77; Cl, 14.58.

EXAMPLE 8

A mixture comprising 200 g. of dimethyl formamide, 18.5 g. of sodium salt of 2,4-dichlorophenol and 13.8 g. of p-chlorobenzonitrile was heated under stirring at 140°–150° C. for 5 hours. Subsequently, the mixture was cooled to room temperature, was charged with 500 g. of water and was then extracted 3 times with benzene. The benzene layers were collected, and the resulting liquid was washed 4 times with water and was then dried over Glauber's salt. Subsequently, the benzene was removed by distillation, whereby 16.6 g. of black, oily 2,4-dichlorophenyl-4'-cyanophenyl ether. This ether was purified according to column chromatography to obtain 15.3 g. of pale yellow 2,4-dichlorophenyl-4'-cyanophenyl ether, $n_D^{15.0}$ 1.6388.

Elementary analysis for $C_{13}H_7Cl_2NO$.—Calculated (percent): C, 59.34; H, 2.68; Cl, 26.95; N, 5.32. Found (percent): C, 59.21; H, 2.66; Cl, 26.89; N, 5.30.

What is claimed is:

1. A diphenyl ether having the general formula,

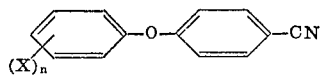

wherein X is alkyl having 1 to 4 carbon atoms, halogen or a combination thereof and n is an integer of 1–3.

2. A compound of the formula,

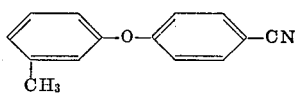

3. A compound of the formula,

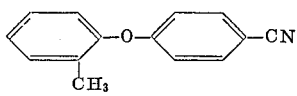

4. A compound of the formula,

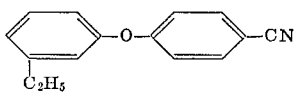

5. A compound of the formula,

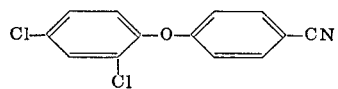

6. A compound of the formula,

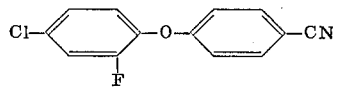

7. A compound of the formula,

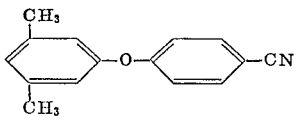

8. A compound of the formula,

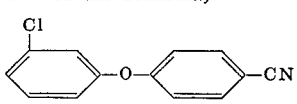

9. A compound of the formula,

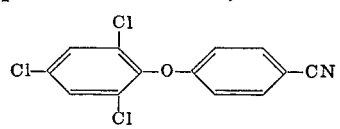

10. A compound of the formula,

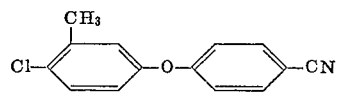

References Cited

UNITED STATES PATENTS

| | | | |
|---|---|---|---|
| 3,185,725 | 5/1965 | Koopman | 260—465 |
| 3,322,525 | 5/1967 | Martin et al. | 260—465 X |
| 3,423,470 | 1/1969 | Rohr et al. | 260—465 X |
| 3,506,720 | 4/1970 | Model et al. | 260—465 X |
| 3,535,365 | 10/1970 | Weinstock et al. | 260—465 |

OTHER REFERENCES

Yates: Chemical Abstracts, vol. 61, pp. 5574–5 (1964).
Bonnier et al.: Chemical Abstracts, vol. 65, p. 5392 (1966).

LEWIS GOTTS, Primary Examiner

D. H. TORRENCE, Assistant Examiner

U.S. Cl. X.R.

71—105; 260—141, 571, 612 R